Dec. 31, 1957 R. E. MASON 2,818,127
CHASSIS CONSTRUCTION FOR THREE WHEEL POWER-DRIVEN VEHICLE
Filed Oct. 7, 1954 3 Sheets-Sheet 1

INVENTOR.
ROBERT E. MASON
BY
Harry H. Hitzeman
ATTORNEY.

Dec. 31, 1957  R. E. MASON  2,818,127
CHASSIS CONSTRUCTION FOR THREE WHEEL POWER-DRIVEN VEHICLE
Filed Oct. 7, 1954  3 Sheets-Sheet 2
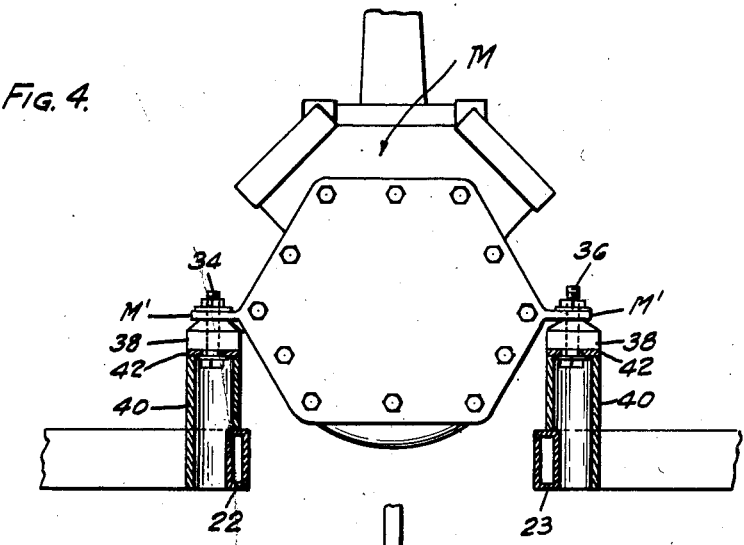
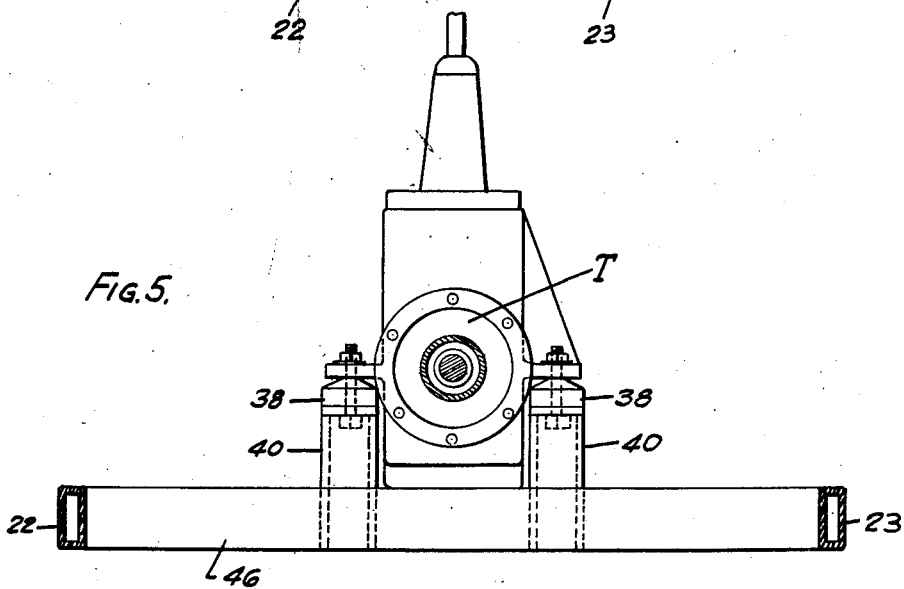
INVENTOR.
ROBERT E. MASON
BY
Harry N. Hitzeman
ATTORNEY.

Dec. 31, 1957 R. E. MASON 2,818,127
CHASSIS CONSTRUCTION FOR THREE WHEEL POWER-DRIVEN VEHICLE
Filed Oct. 7, 1954 3 Sheets-Sheet 3

INVENTOR
ROBERT E. MASON
BY
Harry H. Hitzeman
ATTORNEY.

United States Patent Office 2,818,127
Patented Dec. 31, 1957

2,818,127

CHASSIS CONSTRUCTION FOR THREE WHEEL POWER-DRIVEN VEHICLE

Robert E. Mason, Lemont, Ill.

Application October 7, 1954, Serial No. 460,849

2 Claims. (Cl. 180—27)

My invention relates to improvements in three-wheeled self-propelled vehicles.

My invention relates more particularly to improvements in the construction of the frame or chassis of the same and the method in which the motor, transmission and differential are joined together and mounted so that a highly compact and strong construction is accomplished thereby.

Other features of the invention reside in the construction of a combined differential and power take-off at the rear of the vehicle, the construction by which the motor, transmission and differential are aligned and mounted upon the improved chassis, the means for attachment of the third wheel and its simple, yet efficient construction for steering, and the provision on the chassis or frame of an improved means for attachment of the spring suspension of a body of a vehicle which may be placed upon the same.

For a more comprehensive understanding of the invention and the manner in which the same is achieved, reference is had to the accompanying three sheets of drawings, upon which Fig. 1 is a plan view of a vehicle of the type described including a chassis or frame and showing the mounting of the motor, transmission and differential thereon;

Fig. 4 is a cross-sectional view showing the mounting of the motor on the frame;

Fig. 5 is a similar cross-sectional view showing the mounting of the combined motor and transmission at a point adjacent the connection to the differential housing;

Figures 1, 2, 3:
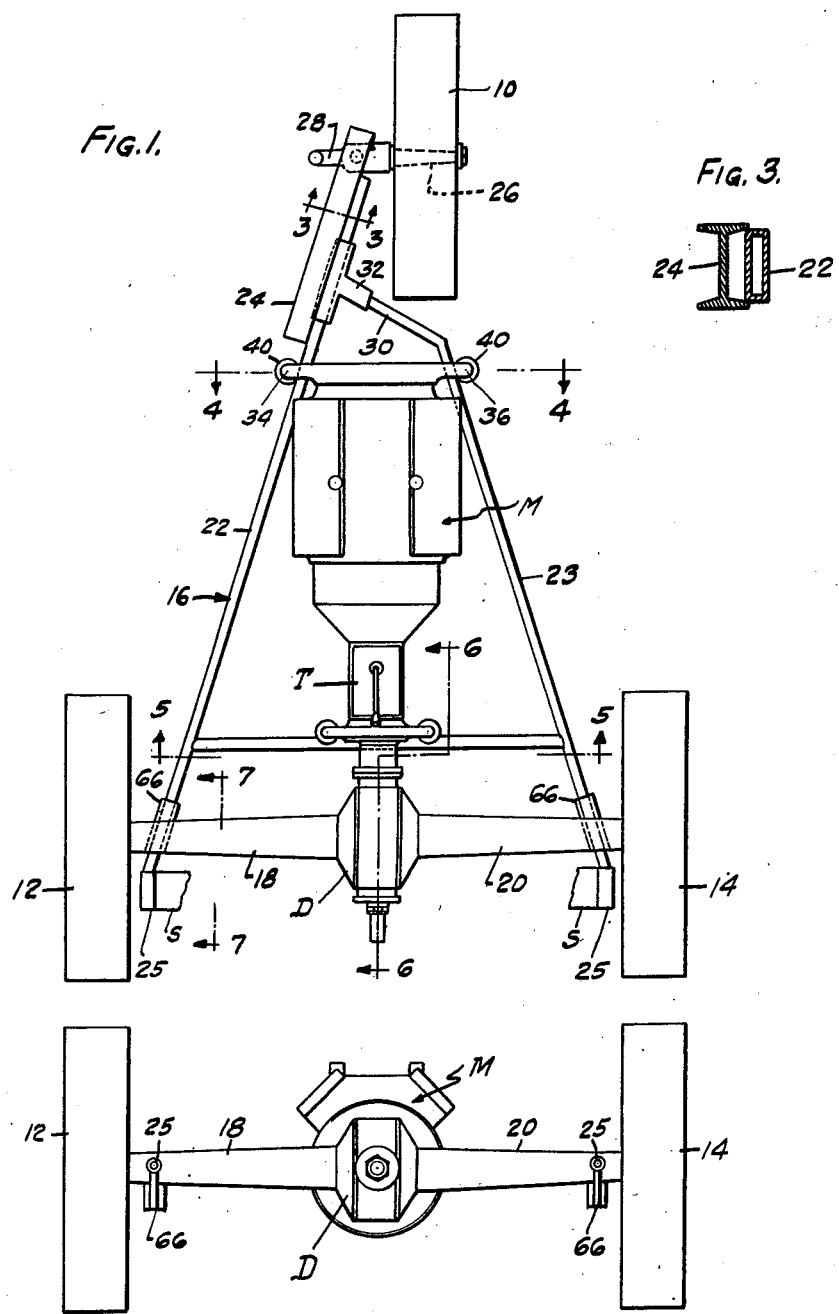
Fig. 2 is an end elevational view of the same.
Fig. 3 is a cross-sectional view through one of the frame elements showing the manner in which the steering spindle may be mounted on a portion of an axle member, the view being taken on the line 3—3 of Fig. 1.
Figure 6:
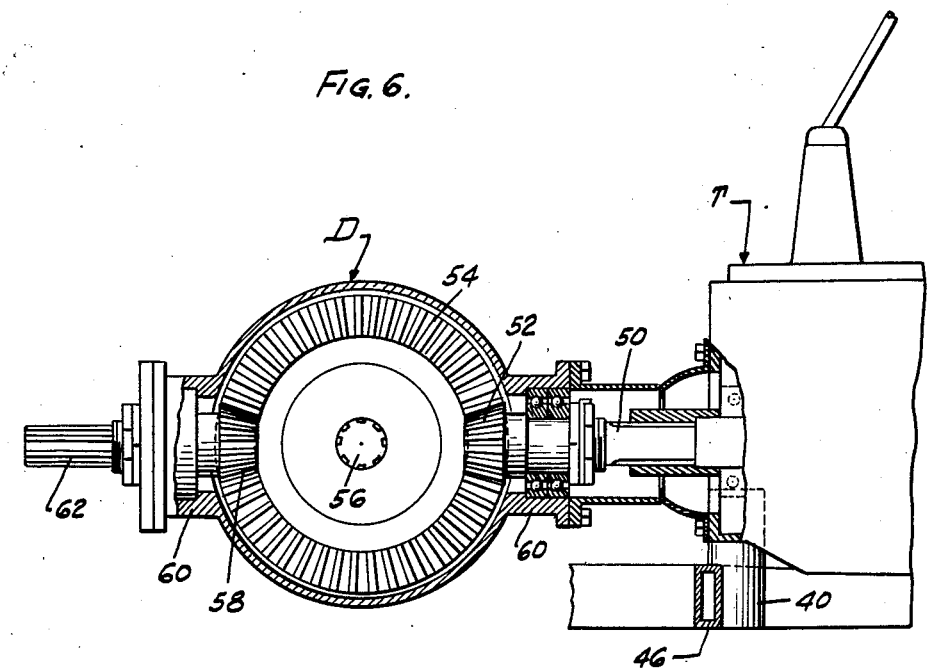
Fig. 6 is a longitudinal sectional view through the differential power take-off and connection to the transmission of the motor, the view being taken generally on the line 6—6 of Fig. 1.
Figure 7:
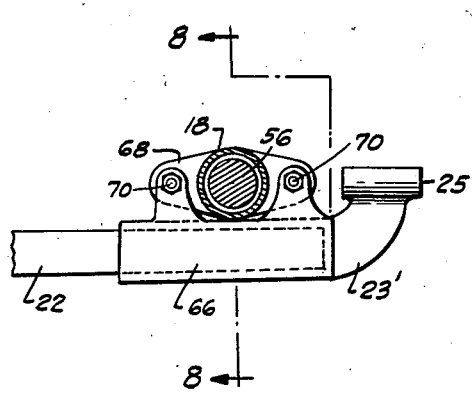
Fig. 7 is a cross-sectional view through one end of the rear axle and housing showing the manner in which the frame is connected thereto and to the spring suspension.
Figure 8:
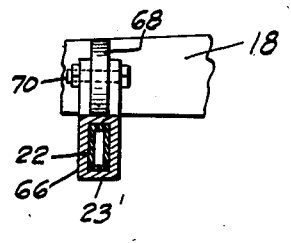
Fig. 8 is a detailed sectional view thereof taken on the line 8—8 of Fig. 7.

In the embodiment of the invention which I have chosen to illustrate and describe, I have shown a three-wheeled vehicle which may include a front support and steering wheel 10, a pair of rear drive wheels 12 and 14 carried in a suitable manner by a triangularly shaped frame 16. The frame 16 is also adapted to support a motor M, transmission T, and differential D, which are connected together in alignment medially of the same and supported upon the frame very effectively in a manner which will be hereinafter more apparent.

The frame 16 may include as integral parts thereof the right and left housing portions 18 and 20 for the rear axles which extend to the drive wheels 12 and 14. A flattened tubular member 22 may extend from the housing 18 forward and be welded or otherwise fastened at its forward end to a section of an I-beam member 24 which carries the front wheel spindle 26 upon which the wheel 10 is mounted, the spindle 26 also having a steering arm 28 connected as desired to suitable steering mechanism, not shown.

The opposite leg 23 of the triangularly shaped frame may extend from the rear axle housing 20 forward and have a bend 30 adjacent the forward end of the same which enters a connecting bracket 32 mounted upon the frame member 22.

The forward end of the motor M, as shown in Figs. 1 and 4, may have side bracket portions M' which receive fastening bolts 34 and 36 connected through suitable pads 38 on the top of two-inch pipe members 40 which are welded to the frame members 22 and 23 respectively. A metal washer 42 may be welded to the top of each of the pipe members 40 and the fastening bolts 34 and 36 may be fastened therethrough to effectively connect the front of the motor to the supports 22 and 23.

The rear portion of the transmission T may be fastened in a similar manner to the top of pads 38 upon vertical pipe members 40 that have been welded to a cross-frame member 46 which is connected between the frame members 22 and 23.

I have shown a direct drive shaft 50 between the transmission T and the bevel gear 52 of the differential which drives the ring gear 54 thereon in the usual manner to transmit power to the rear axles 56 of the vehicle. I provide a second pinion gear 58 connected through a housing portion 60 similar to the housing portion attached to the transmission for driving a splined stub shaft 62 which may be used as a power take-off to drive various equipment if desired from the rear end of the vehicle.

The rear ends of the frame members 22 and 23 are connected by means of a bracket 66 welded to the end of each of the frame members 22 and 23, to a plate 68 connected to each of the housings 18 and 20. This connection is effected by means of bolt members 70 passing through ears extending up from the brackets so that the frame members 22 and 23 are below the rear axles. The back end of each of the brackets 66 is adapted to be curved upwardly as shown at 23' to carry a support portion 25 to receive the channel bolts which connect the axle to the spring members S that support the body upon the vehicle frame 16.

From the above and foregoing description it can be seen that I have provided a comparatively easily constructed yet highly efficient and sturdy three-wheeled vehicle frame arrangement for supporting the motor transmission and differential thereon, as well as effective means for providing the mounting of the steering wheel at the forward end of the same. By the construction of the back ends of the frame and the mounting of the spring shackle bolts thereon, an efficient means has been provided for spring support of a body upon the vehicle frame. In addition, the arrangement of the differential housings and their connection and association with the transmission and motor tends to increase efficiency in vehicles of this type.

I contemplate that changes and modifications may be made in the exact details shown and I do not wish to be limited in any particular; rather what I desire to secure and protect by Letters Patent of the United States is:

1. In a three-wheeled vehicle a framework for supporting the motor, transmission and differential, which comprises a pair of rear axles, rear wheels mounted thereon, housings for said axles, a vertically disposed plate member connected to each of said housings adjacent each of said rear wheels, a pair of frame members having their ends extended to a point below said vertically disposed plates, brackets telescopically mounted over the ends of said frame members, each of said brackets having sets of ears extending up on each side of said plate, bolts through said sets of ears and said plate, said frame members directed diagonally forwardly and toward each other at the same angle, a cross-brace disposed between said frame members adjacent to and parallel to said rear axles, a front wheel spindle mounted at the forward end of said frame, a front wheel on said spindle, a pair of vertically disposed pipe members connected to said frame member near the front of the same, a second pair of vertically disposed pipe members connected to said cross-brace generally medially between the side frame members, said motor and transmission positioned on the top of said pairs of pipe members, one pair of said pipe members at the front of said motor and another pair adjacent the back of said transmission.

2. In a three-wheeled vehicle a framework for supporting the motor, transmission and differential, which comprises a pair of rear axles, rear wheels mounted thereon, housings for said axles, a vertically disposed plate member connected to each of said housings adjacent each of said rear wheels, a pair of frame members having their ends extended to a point below said vertically disposed plates, brackets telescopically mounted over the ends of said frame member, each of said brackets having sets of ears extending up on each side of said plate, bolts through said sets of ears and said plate, said frame members directed diagonally forwardly and toward each other at the same angle, a cross-brace disposed between said frame members adjacent to and parallel to said rear axles, a front wheel spindle mounted at the forward end of said frame, a front wheel on said spindle, a pair of vertically disposed pipe members connected to said frame member near the front of the same, a second pair of vertically disposed pipe members connected to said cross-brace generally medially between the side frame members, said motor and transmission positioned on the top of said pairs of pipe members, one pair of said pipe members at the front of said motor and another pair adjacent the back of said transmission, said frame member brackets curving upwardly beyond said axle housings and having bolt support portions to receive channel bolts to connect to springs to support the vehicle body on the axles.

References Cited in the file of this patent

UNITED STATES PATENTS

| | | |
|---|---|---|
| 1,172,326 | Walker | Feb. 22, 1916 |
| 1,892,865 | Brown | Jan. 3, 1933 |
| 1,918,490 | Riley | July 18, 1933 |
| 2,263,675 | Crosley | Nov. 25, 1941 |